United States Patent Office 3,598,742
Patented Aug. 10, 1971

3,598,742
STABLE FOAMED MATERIALS
Saunders Eliot Jamison, Summit, and Gene Henry Anthony, Whitehouse Station, N.J., assignors to Celanese Corporation of America, New York, N.Y.
No Drawing. Continuation of application Ser. No. 543,083, Apr. 18, 1966. This application Jan. 9, 1970, Ser. No. 3,554
Int. Cl. C11d 17/04
U.S. Cl. 252—91
10 Claims

ABSTRACT OF THE DISCLOSURE

Stable, open-celled, foamed compositions are prepared by combining a fibrous material with a wetting agent, a water-thickening substance and a film of a water-insoluble polymer having a glass transition temperature of less than 50° C.

---

This case is a continuation of application Ser. No. 543,083, filed Apr. 18, 1966, now abandoned.

This invention relates to the production of novel types of foamed material and inexpensive novel products which can be made therefrom.

Man has constantly searched for new ways to convert readily accessible raw materials easily and cheaply into an ever increasing variety of products. One of the most readily available raw materials is vegetable fibers such as wood and cotton. It is an object of this invention to form still further new products from vegetable fibers and other fibrous materials.

Researchers in the late 1920's found that upon agitating a mixture of a fibrous material and a wetting agent, a relatively stable foam could be formed. They further found additives to waterproof, fireproof and increase the rigidity of the foam. It was further discovered that upon subjecting one side of a layer of this foamed material to a vacuum, a thin tough surface skin would form. These foams can be used as heat insulators, sound absorbents, packing materials, cushioning and padding substances and the like.

However serious drawbacks of these materials limited their use to relatively mild environments. They tended to lose their structural integrity under continued heavy loads. Similarly, while the water-proofed foams were relatively stable to atmospheric moisture, they lost their dimensional stability, i.e. structural integrity, during prolonged contact with aqueous solutions. Moreover the limited water resistance developed by the prior art workers was at the expense of a reduced affinity of the fibers themselves for water absorption.

It is an object of the present invention to prepare an inexpensive open-celled foam which is substantially uniform throughout its structure, and which has good dimensional stability under sustained adverse conditions, and which can be water-absorbent.

It is a further object to prepare inexpensive useful articles fabricated from these materials. Such articles include household sponges, synthetic leather, non-woven fabrics, textile insulating materials, diapers, sanitary napkins, structural insulation, light weight supporting structures, filling material, toys, catalytic surfaces, industrial filters and cigarette filters.

These objects have now been realized in the process of this invention which broadly involves agitating a mixture comprising (1) a fibrous material, (2) a wetting agent, (3) water, (4) a suitable thickening material such as sodium carboxymethyl cellulose and (5) a dispersion of a film-formable, water-insoluble resin having a glass transition temperature of less than 50° C. and thereafter drying the foam, and if desired, curing the foam (when a curable resin is employed).

For most end products, the nature of the fibrous starting material is not critical. Cellulose fibers are preferred and wood pulps of moderate alpha cellulose content represent a convenient source thereof. For special applications, for example cigarette filters where flavor is an important factor, refined wood pulps having a high alpha cellulose content are preferred. However except where such special considerations are involved, it is sufficient to employ cheap and readily available fibrous sources: Cotton linters represent one good source. The fiber length is advantageously less than ½ inch, and desirably less than ¼ inch. Longer fibers are more difficulty to disperse but may be present in small amounts (e.g. about 1 to 10%) to add strength.

The relative proportions of fibrous material and water should be such as to produce a tractable slurry. Generally this calls for a weight ratio of water to cellulose of at least 10:1.

The amount of fibrous material that should be present in the dried foamed product can be varied over a wide range, depending upon the properties and uses desired. Generally the fibrous material should constitute from about 30 to 90%, preferably 50 to 85%, by weight, based on the weight of the dried foamed product.

The nature of the wetting agent is not critical except that it should be compatible with the other ingredients used and one which has the property of forming relatively stable bubbles or foam in their presence. Exemplary of such wetting agents are sodium lauryl sulfate, particularly a grade containing some free lauryl alcohol, the glucoside saponin, salts (particularly sodium salts) of long chain sulfonic acids such as long chain alkylbenzene sulfonic acids, long chain alkanolamides such as lauric mono- or di-ethanolamide, alkylphenol-ethylene oxide condensation products, and long chain quaternary ammonium compounds such as hexadecyltrimethyl-ammonium bromide. The proportion of foaming agent is advantageously in the range of about 0.2 to 1% based on the weight of water in the slurry except when free wetting agent is desired to be incorporated into the product as described hereinafter.

The water-insoluble resin should have the ability to form a continuous film at relatively low temperatures upon the evaporation of the water. Although resins having a glass transition temperature of as high as 50° C. are utilizable, it is preferred, and particularly for such end uses as sponges, that the glass transition temperature be 20° C. or less. Tables of glass transition temperature factors are readily available so that the glass transition temperatures of copolymers based on the percent constituent monomers can readily be ascertained by adding the temperature factors of each constituent corresponding to its percentage in the copolymer. For example the glass (transition) temperature of a copolymer consisting of 55% methyl methacrylate, 40% ethyl acrylate and 5% butyl methacrylate can be calculated from the tables of Rohm and Haas acrylic glass temperature analyzer by adding together the corresponding temperature factors, 1.46, 1.59 and 0.17, respectively, to yield a net temperature factor of 3.22 which corresponds to a glass temperature of 38° C. The minimum film-forming temperature (M.F.T.) is slightly lower than the glass transition temperature due to the presence of impurities. Thus the glass transition temperature represents a readily ascertainable theoretical limit for determining whether a polymer or copolymer is within the scope of the invention.

The resin can optionally be curable, i.e. cross-linkable either by thermal or chemical treatment, or not, depending largely on the intended end use. For example in preparing leather-like products and sponges, the use of a curable resin is essential, while in preparing cigarette filters the property of curability is not necessary.

Homopolymers or copolymers can be employed. Exemplary of suitable resins are polyvinylacetate, polyvinylidene chloride, polybutyl acrylate and cross-linkable acrylics. Homopolymers of vinylchloride, styrene and acrylonitrile are not suitable resins for this invention, however copolymers in which these monomers are included and which have a suitably low glass transition temperature are utilizable. Numerous commercial formulations are available. For example, the polyvinyl acetate homopolymer emulsion used in Example III, CL–101, was prepared by the polymerization of vinyl acetate monomer using a hydrogen peroxide catalyst solution and a Hydrozin (zinc formaldehyde sulfoxylate) activator solution and an Elvanol (polyvinyl alcohol) colloid solution. The cross-linkable acylic emulsion used in Example I, CL–306, is the reaction product of ethyl acrylate, N-methylolacrylamide and itaconic acid along with various conventional emulsifier, catalyst and activator solutions. Ethyl acrylate is the principle monomer. The cross-linkable acrylic emulsion of Example II, CL–304, is similar to CL–306, but also employs, as an additional comonomer, methyl acrylate in an amount by weight about half that of the ethyl acrylate. Additionally it contains about 3% of the wetting agents Igepal CO–977 and Igepal CO–897 (alkylphenol-ethylene oxide condensation products). The number of possible resinous emulsion formulations utilizable in the instant invention is almost limitless and many combinations will be apparent to one skilled in the art. The film-forming, water-insoluble resin should be added as a dispersion, preferably an aqueous dispersion, in an amount such as to be present in the final dried product in a minor concentration generally less than 50%, e.g. within the range of about 5% to 45%, based on the weight of the dried foam. In some cases, it will be necessary to supply somewhat more resin to the slurry than will appear in the final product, since some of the resin may appear in the liquid draining from the foam.

Suitable polyelectrolyte thickening materials include the water soluble salts of carboxymethylcellulose, e.g. sodium, ammonium, calcium, and potassium carboxymethylcellulose, sodium alginate and other water-soluble alginates, poly (sodium acrylate), poly (ammonium acrylate) and copolymers containing these acrylic monomers. The polyelectrolyte thickening materials should be present in an amount by weight of about from 0.2% to 5%, preferably 1% to 3%, based on the weight of dry foamed product. Non-electrolytic thickening materials such as starch can be employed but they are not preferred, particularly for flexible structures. They generally require significantly higher concentrations to be as effective as the polyelectrolytic thickeners.

The drainage allowed should be minimal in the case where a concentrate mixture is employed, as in Examples I and II. Thus the wet foam from such a concentrate should be deposited on a non-permeable mat and dried with minimal run-off. Where a dilute mixture is employed, greater drainage is of course called for and this can be accomplished by placing the wet foamed product on a perforated mat. In any event, a substantial amount of water evaporation is essential to insure formation of the polymer film.

The drying step can be accomplished by subjecting the wet foamed materials, after appropriate drainage, to temperatures of 100° C to 200° C. for a suitable time. The time depends upon the temperature, the shape and composition of the wet foamed product and the like. This step is conveniently performed by placing the drained foam in an oven at about 120° C. for several hours. In the case of the curable materials, curing can readily be completed by then subjecting the dried and partially cured foam to temperatures of about 150–250° C.

The mechanism by which the combination of the film-forming resin and the water-thickening material function to yield foamed structures of such dimensional integrity is not completely understood but appears to be a combination of hydrodynamic, electrostatic, and chemical effects.

Absent these small, almost catalytic, amounts of thickening material, the emulsion resin binders migrate during drying to the bottom by drainage and to the upper surface by "wicking." This migration not only leaves the interior weak and moisture sensitive but also makes removal from the supporting surface extremely difficult and leaves the upper surface with a non-uniform appearance through formation of a skin.

On the other hand if too much of the polyelectrolyte thickening material is used, e.g. an amount equal to that of the emulsion polymer, the viscosity of the slurry is prohibitively high, foaming is difficult if not impossible, and the movement of the slurry requres excessive pressures.

One interesting use for these stable open-celled foamed materials is as a detergent-bearing household sponge. For this purpose, excess wetting agent, i.e. from 1% to about 20%, is employed in the original mixture. A film-formable water-insoluble resin which has a glass transition temperature no higher than 20° C. should be used. The foamed material is shaped into a sheet having a size suitable for various household uses including washing automobiles and is then dried and cured. This sponge in contact with an aqueous medium provides its own detergent. Upon immersion in water, it becomes completely flexible and resilient and readily releases suds on being pressed against a solid surface. This sponge is sufficiently inexpensive to dispose of after all the wetting agent is exhausted.

The wetting agent when thus used in excess for its detergent action need not be chosen for maximum foaming efficiency but rather for its cleaning efficiency and economy. Thus relatively inexpensive and low foaming wetting agents with excellent cleaning power, such as the alkylphenoxypolyethyleneoxides, will easily provide a sufficient foaming power in the quantities used in these preparations. Similarly conventional detergent additives can be incorporated.

A typical weight percent composition of such a dry detergent sponge is 50–55% wood pulp, 33% curable acrylic emulsion solids, 10–15% wetting agent and 2–3% sodium carboxymethylcellulose.

Such sponges prepared without sodium carboxymethylcellulose or an equivalent polyelectrolyte thickener will not retain their strength on immersion in water because the resin binder will have wicked up to the surface in the drying process and will not remain uniformly distributed in the sponge structure to provide bonding strength throughout.

Example I illustrates the preparation of such a detergent-bearing sponge. All parts are by weight unless otherwise indicated.

EXAMPLE I

The following materials were introduced into a one-quart Waring Blendor.

331 ml. water
50 g. CL–306 (46% solids, 54% water) (discussed above)
1.5 g. sodium carboxymethyl cellulose
8.5 g. Igepal CO 630 (an alkylphenoxypolyethyleneoxyethanol surfactant)
33.3 g. acetate grade wood pulp These ingredients were blended slowly to produce a smooth slurry, the pulp being added last and introduced slowly as it was dispersed into the mixture. The speed of mixing was then increased sufficiently to produce a foam of 900–950 ml. This was deposited on a Teflon mat on which it was confined to an area of 10 in. x 10 in. The foam dried in 3–5 hours in an oven kept at 120° C. and in less than one hour at 200° C. The sponge-like product recovered relatively slowly from bending and compression when dry, but became extremely flexible and resilient on immersion in water. Water was readily absorbed by the dampened structure when it had been squeezed out. Surfactant suds issued from the structure when it was pressed against the skin or any hard surface, with effective cleaning action.

Another interesting application of the foamed materials of this invention is in making leather-like materials. To this end, the dried pads containing a thermosetting resin are passed between flat plates, one of which is heated, and at the same time subject to very high pressures for up to several minutes. The temperature of the heated plate should be between about 100° C. to 250° C. and the pressure should be about 200 to 75,000 p.s.i.

In this application, a distinction has to be drawn between low and high bulk density foamed pads. Overall, the density of the dried product ranges from about 0.05 to 0.25 g./cc. The low bulk density foams are considered those having a density of less than 0.10 gram per cubic centimeter or less. The high bulk density foams are considered those having a density greater than 0.1 gram per cubic centimeter.

The bulk density can be readily controlled by the amount of water and air introduced into the slurry. The following example illustrates the relationship. All parts are by weight unless otherwise specified.

EXAMPLE II

Varying quantities of water were mixed with the following composition:

200 parts wood pulp
300 parts CL–304 emulsion (46% solids, 54% water) (discussed above)
5 parts sodium carboxymethylcellulose The agitation necessary to produce the foam is carried out in a 1-gallon Hobart mixer, the volume of foaming being related to the degree of agitation. Air retention in the foam is assured by the 3% wetting agent content of the CL–304 emulsion as nonylphenoxypoly (ethyleneoxy) ethanol. The foam is dried as ⅜-inch sheets in a 120° C. oven. The relationship between water and air incorporation and bulk density is shown in Table I.

TABLE I

| Parts water | Foams volume (ml.) | Bulk density (g./cc.) |
| --- | --- | --- |
| 950 | 10,000 | 0.047 |
| 1,430 | 8,700 | 0.08 |
| 750 | 2,400 | 0.14 |
| 750 | 1,400 | 0.22 |

The pressure-temperature treatment of this invention is illustrated as follows. Four foamed product sheets each of different bulk density, produced in the manner of Example II, were cut into square tiles of about 5 inches x 5 inches. Each was passed between flat plates, one of which was heated, and subjected to the conditions as indicated in Table II.

The sheets after the treatment had a smooth, tough, dense surface on the upper side which had been heated. The other side was not skinned over at all except in the cases of the low bulk density pads where the heat transmitted from the upper side was sufficient to cure the entire mass of the original pad. The side not subject to the heat treatment was also compressed considerably, but upon immersion in water expanded to give a resilient under padding to the leather-like cured upper surface. In a cross section of the thus-produced material, the cured and uncured regions could be readily distinguished. If the other plate is allowed to heat up, this effect is to a large extent lost even with the higher density pads as evidenced by the failure to reexpand substantially upon immersion in water. If a thick pad is subjected to this treatment on both sides, a sandwiched product can be obtained having tough leathery exteriors and a soft, insulating interior. Such a product is well suited for apparel use.

Thus, by this embodiment of the process of this invention surface modifications can be achieved ranging from merely smoothening the surface of the foam pad to providing a fairly thick, dense, tough, leathery exterior which is still permeable to water vapor. Decorative effects can be produced by applying the heat-pressure treatment to only selected areas of the pad. This can be achieved for example, using a plate having raised or depressed areas in a predetermined pattern. The treated pad thus assumes the contour or profile of the plate in negative. Alternatively, a shield of a heat-absorbant material cut in a predetermined design can be interposed between the plate and the pad. Similarly the plates can have areas or zones of different temperature and/or pressure values.

Another important application for the foamed materials of this invention is in cigarette filters. Two important properties that the filter cigarette-smoking public demands in its filter tips are a low pressure drop and firmness both before and during smoking, notwithstanding the softening tendency of moisture in the tobacco smoke. Cost to the producer is of course always significant.

The following example illustrates the preparation of such filter tips according to the process of this invention.

EXAMPLE III

The following ingredients, with the amounts of Argo Corn Starch indicated in Table III, were foamed to 800 ml.

| | Grams |
| --- | --- |
| Wood pulp | 8 |
| CL–101 (55% solids, 45% water) (discussed above) | 9 |
| Sodium dodecylbenzenesulfonate (Atlantic Refining Co.—Ultrawet K soft) | 0.5 |
| Lauric diethanolamide (General Aniline and Film Corp.—Gafamide LD–176) | 0.1 |
| Water containing indicated quantity of Argo corn starch | 210 |

The foam was dried as sheets of ¾-inch height at 120° C. Filter tips were prepared in the conventional manner

TABLE II

| Bulk density (g./cc.) | Total pressure (p.s.i.) | Temp. of heated plate (° C.) | Time of heating (sec.) | Orig. height (cm.) | Final skin thickness (cm.) | Final total thickness (cm.) | Skin/total thickness |
| --- | --- | --- | --- | --- | --- | --- | --- |
| 0.08 | 1,000 | 150 | 30 | 0.65 | 0.003 | 0.65 | <0.01 |
| | | 175 | 30 | 0.65 | 0.008 | 0.57 | 0.01 |
| | | 200 | 30 | 0.65 | 0.015 | 0.48 | 0.03 |
| | 50,000 | 200 | 30 | 0.65 | 0.040 | 0.16 | 0.25 |
| | | 200 | 120 | 0.65 | 0.110 | 0.11 | 1.0 |
| 0.15 | 50,000 | 200 | 30 | 0.98 | 0.049 | 0.63 | 0.08 |
| | | 200 | 60 | 0.98 | 0.065 | 0.51 | 0.13 |
| | | 200 | 90 | 1.20 | 0.13 | 0.41 | 0.32 |
| | | 200 | 120 | 0.95 | 0.17 | 0.39 | 0.43 |
| 0.20 | 1,000 | 200 | 30 | 1.07 | 0.0065 | .84 | <0.01 |
| | | 200 | 60 | 1.07 | 0.041 | .86 | 0.05 |
| | | 200 | 120 | 1.07 | 0.098 | .79 | 0.12 |
| 0.22 | 50,000 | 200 | 90 | 1.14 | 0.21 | 0.49 | 0.42 |
| | 25,000 | 200 | 120 | 1.14 | 0.23 | 0.46 | 0.53 | from strips of these sheets. The tips, 20 mm. long, were attached to 64 mm. lengths cut from the same commercial brand of cigarettes.

Table III shows the effect of the concentration of starch or the indicated filter tip properties when the above produced cigarettes are subject to standard smoking test conditions. Corresponding data on a commercial filter-tip cigarette is also included. Firmness was determined as the percentage of the original diameter of the filter retained on application of a one-pound load.

TABLE III

| Starch added (grams) | Tip pressure drop (mm. H₂O) | Firmness (percent) | |
|---|---|---|---|
| | | Before Smoking | After smoking |
| None | 58 | 88 | 60 |
| 2.5 | 40 | 89 | 75 |
| 5.0 | 49 | 93 | 79 |
| Brand "X" | 67 | 78 | 70 |

If relative cost is considered, another advantage of the filter tips of this invention becomes apparent. If no starch is used, much of the polyvinylacetate drains away from the nascent foam thus requiring starting with large excesses of polyvinylacetate emulsions over that which is desired to be incorporated in the filter. However when the starch is present in the foamed slurry, considerably more polyvinylacetate is retained in the dried foam.

Of course, the use of starch without the polyvinylacetate emulsion does not result in an acceptable filter since, inter alia, the filter will not remain intact on moistening with the tongue (failure of tongue test).

Other water-soluble thickeners can be employed in place of starch according to the process of this invention to achieve similar results.

The adaptation of the foamed materials of this invention to numerous other uses will be apparent from this specification to one skilled in the art. By simple experimentation in accordance with the instant invention, one can determine the optimal proportions of each type of ingredient, the optimal specific materials of each type, and the optimal processing conditions to maximize particular characteristics or properties of the foamed materials as required in any given end use.

Conventional additives can be incorporated into the foamed materials to impart other desired properties, e.g. flameproofness, color and the like.

Numerous other variants of the products and processes disclosed herein within the spirit of the invention will be apparent to one skilled in the art.

What is claimed is:

1. A stable, open-celled, foamed composition of matter comprising from about 30 to 90% of a fibrous material, a wetting agent, from about 0.2 to about 5% of a water-thickening substance selected from the group consisting of water-soluble salts of carboxymethylcellulose, water-soluble alginates, poly (sodium acrylate), poly (ammonium acrylate), copolymers containing said acrylic monomers and copolymers of polyvinylacetate, polyvinylidene a water-insoluble polymer having a glass transition temperature of less than 50° C., said water-insoluble polymer being selected from the group consisting of homopolymers and copolymers of polyvinylacetate, polyvinylidene chloride, polybutyl acrylate, and cross-linkable acrylic resins, and copolymers of vinylchloride, styrene and acrylonitrile.

2. A composition of matter according to claim 1 wherein said fibrous material comprises cellulose fibers.

3. A composition of matter according to claim 2 wherein said water-thickening substance is sodium carboxymethylcellulose and said polymer is a cross-linked acrylic resin.

4. A process for the production of stable foamed materials comprising agitating a mixture of a fibrous material, a wetting agent, a water-thickening substance selected from a group consisting of water-soluble salts of carboxymethylcellulose, water-soluble alginates, poly (sodium acrylate), poly (ammonium acrylate), copolymers containing said acrylic monomers, and starch, and from about 5 to 50% of a film of a water-insoluble polymer having a glass transition temperature of less than 50° C., said water-insoluble polymer being selected from the group consisting of homopolymers and copolymers of polyvinylacetate, polyvinylidene chloride, polybutyl acrylate, and cross-linkable acrylics, and copolymers of vinylchloride, styrene and acrylonitrile to produce a wetting foam, and thereafter subjecting said wet foam to temperatures of about 100° C. to 200° C. to dry and partially cure the foam and thereafter to temperatures of 150° C. to 250° C. to cure the foam further.

5. A process according to claim 4 wherein said fibrous material comprises cellulose fibers and said water-thickening substance is sodium carboxymethylcellulose.

6. A process according to claim 4 wherein the curing step is accomplished by passing the dried foamed material in sheet form between two plates, at least one of which is heated to a temperature of between about 100° C. and 250° C., at a pressure of between about 200 and 75,000 p.s.i.

7. A process according to claim 6 where said dried foamed material has a bulk density of between about 0.1 and 0.25 g./cc.

8. The process according to claim 7 wherein the heat-pressure treatment is differentially applied, according to a predetermined pattern, to selected areas of the sheet of dried foamed material.

9. A synthetic leather-like material produced by the process of claim 7.

10. A decorated synthetic leather-like material produced by the process of claim 8.

References Cited

UNITED STATES PATENTS

| 2,886,474 | 5/1959 | Kine et al. | 260—17A |
| 3,002,937 | 10/1961 | Parker et al. | 15—506 |
| 3,060,139 | 10/1962 | Greminger et al. | 260—17A |
| 3,080,333 | 3/1963 | Krag et al. | 260—17A |
| 3,318,826 | 5/1967 | Bridgeford | 260—17.4 |

FOREIGN PATENTS

| 656,210 | 8/1951 | Great Britain | 252—91 |
| 1,091,261 | 10/1960 | Germany | 252—307 |

LEON D. ROSDOL, Primary Examiner

W. E. SCHULZ, Assistant Examiner

U.S. Cl. X.R.

252—307, 350

PO-1050
(5/69)

UNITED STATES PATENT OFFICE
CERTIFICATE OF CORRECTION

Patent No. 3,598,742          Dated August 10, 1971

Inventor(s) Saunders E. Jamison and Gene H. Anthony

It is certified that error appears in the above-identified patent and that said Letters Patent are hereby corrected as shown below:

Column 2, line 13, "ficulty" should read ---ficult---

Column 4, line 17, "requres" should read ---requires---

Column 7, line 58, after "mers" please cancel "and copolymers of polyvinylacetate, polyvinylidene" and substitute therefor ---and starch, and from about 5 to 50% of a film of---

Signed and sealed this 25th day of January 1972.

(SEAL)
Attest:

EDWARD M.FLETCHER,JR.
Attesting Officer

ROBERT GOTTSCHALK
Commissioner of Patents